No. 842,062.  
PATENTED JAN. 22, 1907.
A. G. BECKMAN & J. S. SCHELL.  
LEVEL.  
APPLICATION FILED SEPT. 5, 1906.
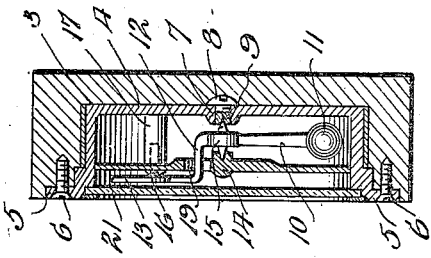
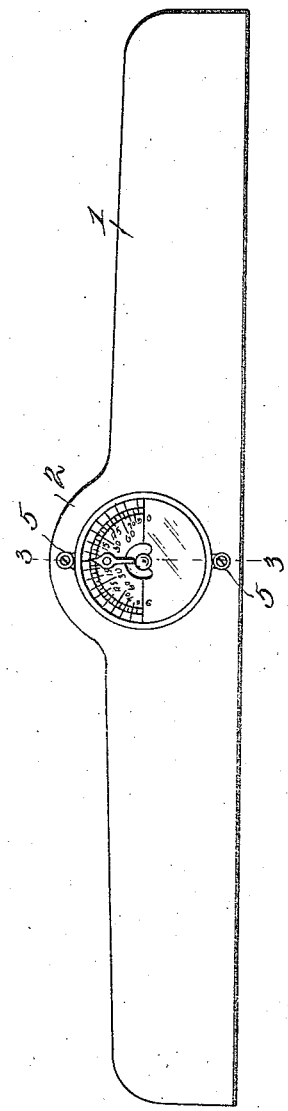
Witnesses  
Inventors  
A. G. Beckman  
J. S. Schell  
By Victor J. Evans  
Attorney

UNITED STATES PATENT OFFICE.

ADOLPH G. BECKMAN AND JACOB S. SCHELL, OF BALTIMORE, MARYLAND.

LEVEL.

No. 842,062.   Specification of Letters Patent.   Patented Jan. 22, 1907.

Application filed September 5, 1906. Serial No. 333,404.

*To all whom it may concern:*

Be it known that we, ADOLPH G. BECKMAN and JACOB S. SCHELL, citizens of the United States, residing at Baltimore, State of Maryland, have invented new and useful Improvements in Levels, of which the following is a specification.

This invention relates to levels; and one of the principal objects of the same is to provide a level in which the degrees of inclination will be indicated upon the dial.

Another object of the invention is to provide a level with an indicator-disk having indicator-marks thereon and a combined pendulum and pointer for indicating the various degrees of inclination of any object upon which the level is placed.

Another object is to provide a level which is especially adapted for sewage, ditching, and drain work in which the various inclinations can be readily determined.

These and other objects are attained by means of the construction illustrated in the accompanying drawings, in which—

Figure 1 is a side elevation of a level made in accordance with our invention. Fig. 2 is a plan view of the indicating-dial. Fig. 3 is a vertical section on the line 3 3 of Fig. 1, shown on an enlarged scale.

Referring to the drawings for a more particular description of our invention, the numeral 1 designates the level-stock, having a central enlargement 2 and a recess 3 formed in one side thereof to contain the operative mechanism. Fitted within the recess 3 is a metal casing 4, having oppositely-disposed perforated lugs 5, through which the attaching-screws 6 are passed for holding the casing within the level-stock flush with the outer face thereof. Fitted into a boss 7 at the back of the casing is a bearing-screw 8, having a bearing-notch therein for the double-pointed pivot 9 of the combined pendulum and pointer, said combined pendulum and pointer comprising an arm 10, having a weight 11 thereon and an offset portion 12 above the pivotal point and a pointer 13 extending upward outside the indicating-dial 14. The double-pointed pivot 9 extends through a hole in an enlargement 15 in the pendulum and pointer shaft. The pivot 9 is pivoted at its front end in the dial-plate 14, and said dial-plate is held by screws 15 upon lugs 17, cast upon the inner wall of the casing. The dial-plate has a semicircular recess or slot 19 therein to permit the free movement of the offset portion 12 of the pendulum and pointer, and upon said dial are the degree-marks 20 to indicate the degree from zero representing the vertical to ninety degrees on the opposite sides thereof, the lower half of the dial-plate being plain. A glass disk 21 is fitted over the dial-plate to permit the movements of the pointer 13 to be readily seen.

The operation of the invention may be briefly described as follows: By placing the level upon an object the pointer will immediately indicate the inclination, owing to the weighted end 11 of the pendulum, and since the indicating-marks are readily discernible through the glass cover 21 the advantages over the ordinary spirit-level will be obvious.

Having thus described the invention, what we claim is—

The herein-described level consisting of a stock, a casing fitted within said stock and provided with a bearing-screw which passes through the rear wall of said casing and is concealed by said stock, a dial-plate secured within the casing, a combined pendulum and pointer provided with a double-pointed pivot mounted to turn in the bearing-screw and in a recess in the dial-plate, an offset on the pendulum and pointer-shaft, said offset extending through a semicircular opening in the dial-plate, and a glass cover for the casing.

In testimony whereof we affix our signatures in presence of two witnesses.

ADOLPH G. BECKMAN.
JACOB S. SCHELL.

Witnesses:
JOHN MILLER,
ANTON WOLPEL.